March 16, 1954 — O. J. SWENSON — 2,672,330
SOLVENT STRIPPING APPARATUS
Original Filed May 29, 1947

Inventor
Oscar J. Swenson
By Robert J. Leahy
Attorney

Patented Mar. 16, 1954

2,672,330

UNITED STATES PATENT OFFICE 2,672,330

SOLVENT STRIPPING APPARATUS

Oscar J. Swenson, Crystal Lake, Ill., assignor to The Cuban-American Sugar Company, New York, N. Y., a corporation of New Jersey, and S. C. Johnson & Son, Inc., Racine, Wis., a corporation of Wisconsin Original application May 29, 1947, Serial No. 751,439. Divided and this application May 8, 1950, Serial No. 160,739

3 Claims. (Cl. 261—84)

This invention relates to a method of stripping entrained solvent from cachaza and apparatus therefor. More particularly, it relates to a novel method of stripping from sugar mill press cake, more generally known as cachaza, the entrained solvent which remains after wax has been extracted from the cachaza, and a novel vertical type apparatus for use therewith.

This application is a divisional of my co-pending application, Serial Number 751,439, filed May 29, 1947 now abandoned for a Method of Stripping Solvent and Apparatus Therefor.

Cane wax is present on the outer surface of the stalk in all varieties of sugar cane. Various methods for obtaining this wax have been proposed, as by scraping the stalk with a sharp instrument, and by passing the stalks through a bath of water heated sufficiently to melt the wax prior to pressing. Rosales, United States Patent No. 2,009,522, suggested drying the cachaza as dry as possible before extracting the wax. However, none of these proposals have proven to be practical.

Cachaza is generally filtered either through a plate-and-frame filter, or a rotary vacuum filter, and the sucrose content recovered. Generally, a filter aid such as bagacillo is used with the rotary vacuum filter which results in a more porous filter cake from which the sucrose content may be more efficiently removed.

After the cachaza has been filtered, it is treated with a solvent which extracts cane wax therefrom. In order to make the extraction process commercially feasible, it is essential that any entrained solvent in the extracted cachaza be recovered.

I have, therefore, developed a new and novel method for stripping entrained solvent from cachaza using a vertical type stripper wherein cachaza in a fluid state is intimately contacted with steam and the entrained solvent removed from the cachaza by vaporization. I have also developed a novel vertical stripper particularly adaptable for carrying out this method.

My invention, therefore, broadly stated is the method of stripping entrained solvent from cachaza comprising flowing liquid cachaza downward, with sufficient agitation to keep in a liquid state through a solvent vaporizing zone maintained at solvent vaporizing temperature, and traveling countercurrent to an upwardly moving stream of steam, and removing the solvent from the solvent vaporizing zone.

In addition, I have developed a solvent stripper particularly adapted for carrying out this method comprising a closed vessel mounted vertically and having charge inlets and discharge outlets, a plurality of vertically spaced horizontal plates so constructed and positioned within said closed vessel to provide a passageway alternately at the outside and center of said plates, a shield affixed to each of said plates to define said passageway, and extending above to provide an overflow weir into said passageway, and extending downward to a point lower than the crest of the overflow weir of the plate below, and agitating means being provided within said vessel. The agitating means includes a vertical shaft having a plurality of arms attached thereto with each arm having a plurality of fingers. The agitating means is positioned immediately above each plate. The plates are preferably foraminous plates of alternately varying size having center apertures of alternately varying size, the larger plates having the larger center apertures.

The invention will be understood by reference to the following description taken in connection with the accompanying drawing in which is shown a vertical type solvent stripper particularly adapted for carrying out the method of this invention. While I have developed the solvent stripper illustrated herewith for carrying out my novel method, it is to be understood that the method is not limited to this type of mud stripper alone. For example, the method may be carried out in a closed vertical vessel devoid of any horizontal plates, but provided with an indirectly or tortuous path so that intimate contacting of the steam, solvent and the cachaza may be achieved.

The same reference numerals have been used by the designation of like parts throughout and in the drawing.

Figure 3:
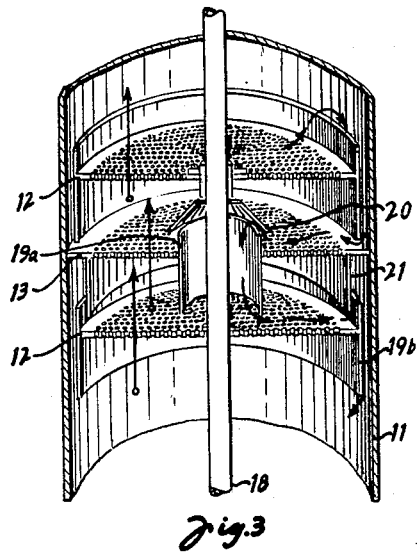
Figure 3 is a partial cross-sectional view in perspective showing the path of the cachaza and of the solvent as it flows through the stripper.
Figure 2:
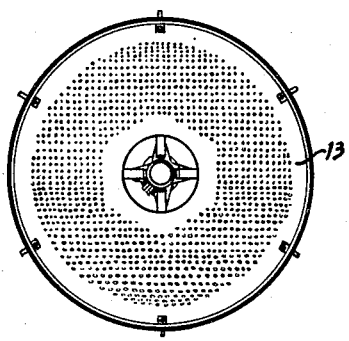
Figure 2 is a top plan view of a horizontal plate with a center passageway taken along the lines 2—2.
Figure 1:
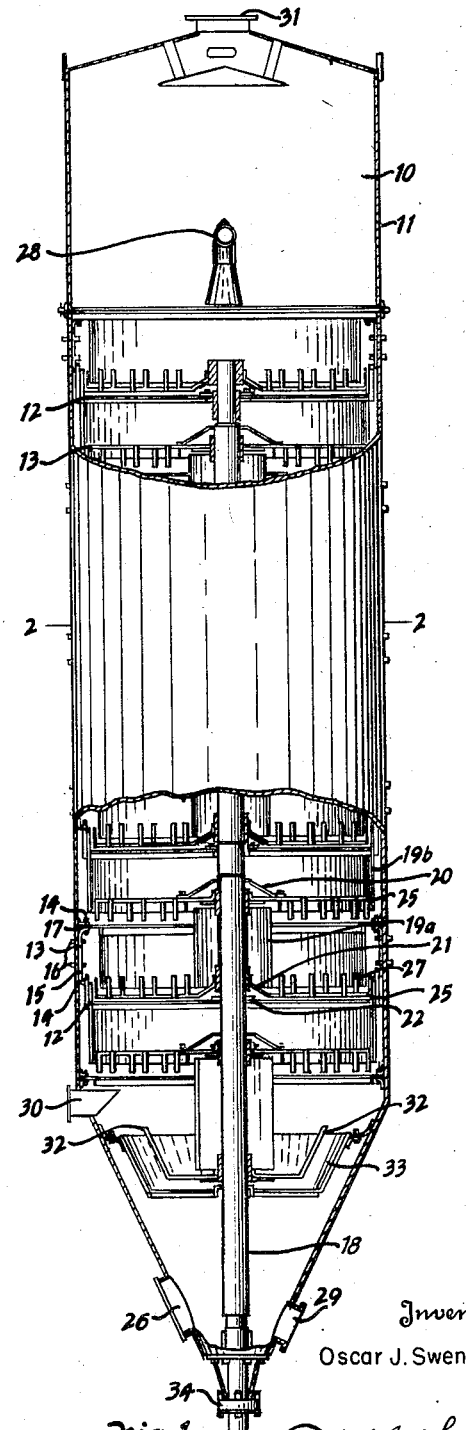
Figure 1 is a front view in elevation of the solvent stripper with the parts broken away shown in cross section.

Referring more specifically to the drawing, the stripper 10 is a vertical type stripper consisting essentially of a closed steel cylindrical shell 11 mounted vertically and containing a plurality of foraminous horizontal steel plates 12 and 13 with a vertical shaft 18 positioned on the longitudinal axis of the cylindrical shell 11.

The plates 12 and 13 are positioned alternately throughout the stripper 10 and are affixed by means of bolts 14 to a bracket assembly 15 which in turn is secured to the cylindrical shell 11 by means of cap screws 16. A sealed ring 17 is positioned between the plate 13 and the inside wall of the cylindrical shell 11 to prevent liquid from passing between the plate 13 and the inside wall of the cylindrical shell 11. Around the center aperture of plate 13 is affixed a cylindrical shield 19a to furnish a passageway for the flow of cachaza from plate 13 to plate 12 below. It will be noted that the top of shield 19a is positioned above the horizontal plate 13 so as to form a weir to maintain the desired depth of cachaza on plate 13. The cachaza overflows the top of shield 19a and flows downward to lower plate 12. It should also be noted that the shield 19a extends downward to a point below the surface of the cachaza on the plate below, providing a passageway for cachaza sealed at the bottom against entry of steam thus forcing the steam to pass upward through the perforations of the plate into the cachaza resting thereon.

The center aperture of plate 12 is closely fitted around shaft 18. A loose-fitting washer 22 surrounds the shaft 18 and rests on plate 12 so as to form a seal to prevent liquid from passing through the center aperture of plate 12. At a plurality of points around its periphery plate 12 is affixed to bracket assemblies 15 by means of bolts 14 and welding in such manner as to provide an opening between the plate 12 and the inside wall of the cylindrical shell 11 to provide the flow of cachaza from plate 12 to lower plate 13. Around the periphery of plate 12 is affixed a cylindrical shield 19b which together with the inside wall of cylindrical shell 11 forms an annular passageway for the downward flow of cachaza from plate 12 to plate 13 below. It should be noted that the shield 19b extends downward to point below the surface of the cachaza on the plate below, providing a passageway for cachaza sealed at the bottom against entry of steam, thus forcing the steam to pass upward through the perforations of the plate into the cachaza resting thereon.

It will also be noted that the top of shield 19b is positioned above the horizontal plate 12 so as to form a weir to maintain the desired depth of cachaza on plate 12. The cachaza overflows the top of shield 19b and flows downward to lower plate 13.

To guard against the possibility of a sufficient amonut of cachaza splashing over the weirs as a result of agitation to break the seal at the bottom of the passageways, splash guards 20 and 21 are positioned adjacent to their respective weirs 19a and 19b respectively.

It will be understood the size of the plates may vary, as well as the size of the passageways depending upon the size of the stripper, operating conditions and the like. It will also be understood that the number of plates may be varied. In the illustrated stripper 10 plates are used.

The vertical shaft 18 passes through the center apertures of the successive plates 12 and 13. To cause the cachaza to behave like a liquid and insure its flow, a plurality of agitator arms 25 are attached to the drive shaft 18 by any suitable means. The arms 25 are provided with a plurality of fingers 27 adapted to agitate the cachaza on the plates 12 and 13. The number of arms may vary. I have used four arms to provide the agitation on each plate in the illustrated stripper 10.

The stripper 10 is provided with a cachaza charge inlet 28 and a cachaza discharge outlet 29. A manhole 26 is provided for inspection. The stripper 10 is further provided with a steam charge inlet 30 and a steam and solvent vapor discharge outlet 31. The bottom of the stripper 10 below the steam charge inlet 30 is preferably in the form of an inverted cone and is provided with stirring arms 32 which are affixed to the vertical shaft 18. Below the stirring arms 32 is positioned an overflow vessel 33. It will be noted that shield 19a affixed to the first plate immediately above the steam charge inlet 30 provides a passageway directly into the overflow vessel 33 the cachaza in which serves to seal the bottom of the passageway. The vertical shaft 18 is provided with a stuffing box assembly 34. The source of power for driving the shaft 18 is not shown.

In operating the stripper 10 live steam is introduced into the base of the stripper 10 through steam charge inlet 30 and passes upward successively through the perforations in the foraminous horizontal steel plates 12 and 13 and the layer of cachaza above each plate. The cachaza containing the entrained solvent, such as heptane, is introduced in the liquid state into the stripper 10 through a cachaza charge inlet 28. The cachaza overflows the weir along the outside periphery of plate 12 and descends to lower plate 13. The cachaza then flows radially to the center of lower plate 13 and overflows the weir there and descends to plate 12 below. Thereafter the cachaza flows downward through successive plates repeating the cycle described above. As the steam issued through the openings in any particular plate it is met by the agitator arm 25 and thoroughly mixed with the cachaza thereby providing good contact between the cachaza and the steam. The steam heats the cachaza and vaporizes the entrained solvent and carries the vaporized solvent upwardly through the stripper 10. The steam carrying the vaporized solvent leaves the stripper 10 through a steam-solvent vapor discharge outlet 31. The solvent may be recovered by condensing the steam and the solvent vapor and decanting the resultant mixed condensates to separate the solvent from the water.

The operating conditions in carrying out my method will vary over a wide range. The liquid cachaza as it enters the stripper 10 is preferably around 200° F. Since this is above the mutual boiling point of water and heptane, a considerable portion of the heptane flashes into vapor immediately at the point of entry. Saturated steam enters the bottom of the stripper 10 and heats the cachaza and solvent as the steam rises. The temperature of the steam-solvent vapor as it leaves the stripper 10 is upward of the mutual boiling point of the solvent and water at the existing pressure. It will be understood that stripping temperatures will vary in accordance with the solvent used, the type of strippers used and the desired operating conditions.

While I prefer the use of heptane in carrying out the extraction of the crude wax from the cachaza, because of its low price and availability, there are various other water-immiscible organic solvents which may be used. For example, there may be used such solvents as benzene, toluene, xylenes, hexanes, heptanes, octanes, nonanes, singly or in admixtures, saturated cyclic hydrocabrons, as cyclohexane, and chlorinated hydrocarbons, as for example, butyl chloride and amyl chloride. Other solvents may be used, such as, lower alkyl acetates and propionates having from 1 to 5 carbon atoms, such as methyl, ethyl, propyl, butyl and amyl derivatives. The stripper described in accordance with my invention will operate to remove any of the wax solvents used in the extraction.

While I have disclosed herein a novel method and apparatus for stripping entrained solvent from cachaza, attention is directed to the following related applications which I am prosecuting simultaneously with this application as follows:

I have disclosed and claimed a complete system of extracting wax from cachaza wherein the step of stripping entrained solvent from the cachaza is claimed in combination with several other steps in my co-pending application S. N. 751,442, filed May 29, 1947 in the United States Patent Office, now Patent Number 2,508,002.

I have specifically claimed the method and apparatus for extracting wax from cachaza in my co-pending application S. N. 751,441, filed May 29, 1947 in the United States Patent Office, now Patent Number 2,554,073.

Other modes of applying the principle of the invention may be employed instead of those explained, changes being made as regards the method or apparatus herein disclosed provided the steps or elements stated by any of the following claims or the equivalent of such stated steps or elements be employed.

I claim:

1. A solvent stripper comprising a closed vessel mounted vertically and having charge inlets and discharge outlets, a vertical rotatable shaft centrally located within said vessel, a plurality of single, vertically spaced horizontal foraminous plates alternately disposed adjacent to the inner periphery of said vessel and said vertical shaft to provide alternate circumferential, passageways defined by cylindrical bands coacting with said inner periphery, and central passageways, defined by tubular shields coacting with said vertical shafts, for the descent of fluid material, said tubular shields extending above each of said plates a predetermined distance to provide an overflow weir into said passageway and extending below each of said plates to a point lower than the crest of the overflow weir of the plate below, and agitating means being provided within said vessel.

2. A solvent stripper comprising a closed vessel mounted vertically and having charge inlets and discharge outlets, a vertical rotatable shaft centrally located within said vessel, a plurality of single, vertically spaced horizontal foraminous plates alternately disposed adjacent to the inner periphery of said vessel and said vertical shaft to provide alternate circumferential, passageways defined by cylindrical bands coacting with said inner periphery, and central passageways, defined by tubular shields coacting with said vertical shafts, for the descent of fluid material, said tubular shields extending above each of said plates a predetermined distance to provide an overflow weir into said passageway and extending below each of said plates to a point lower than the crest of the overflow weir of the plate below, and agitating means being provided within said vessel, said means including a plurality of arms affixed to said vertical shaft, said arms being adapted to move across the upper surface of said plates.

3. A solvent stripper comprising a closed vessel mounted vertically and having charge inlets and discharge outlets, a vertical rotatable shaft centrally located within said vessel, a plurality of single, vertically spaced horizontal foraminous plates alternately disposed adjacent to the inner periphery of said vessel and said vertical shaft to provide alternate circumferential, passageways defined by cylindrical bands coacting with said inner periphery, and central passageways, defined by tubular shields coacting with said vertical shafts, for the descent of fluid material, said tubular shields extending above each of said plates a predetermined distance to provide an overflow weir into said passageway and extending below each of said plates to a point lower than the crest of the overflow weir of the plate below, splash guards positioned adjacent to said overflow weirs, and agitating means being provided within said vessel and having means adapted to move across the upper surface of said plates.

OSCAR J. SWENSON.

References Cited in the file of this patent

UNITED STATES PATENTS

| Number | Name | Date |
| --- | --- | --- |
| 1,480,888 | Marshall | Jan. 15, 1924 |
| 1,782,862 | Wagner | Nov. 25, 1930 |
| 2,007,759 | Harmon | July 9, 1935 |
| 2,339,561 | Durrum | Jan. 18, 1944 |
| 2,558,222 | Parkinson | June 26, 1951 |

FOREIGN PATENTS

| Number | Country | Date |
| --- | --- | --- |
| 7,536 | Great Britain | Mar. 25, 1911 |
| 444,911 | Germany | May 21, 1927 |
| 839,695 | France | Jan. 7, 1939 |